May 19, 1925.

H. J. LUFF

RESEALING TRAP

Filed June 9, 1922

Witness:
A. J. Sauser.

Inventor:
Henry J. Luff,
By Samuel N. Pond
Atty.

May 19, 1925. 1,537,955
H. J. LUFF
RESEALING TRAP
Filed June 9, 1922 2 Sheets-Sheet 2
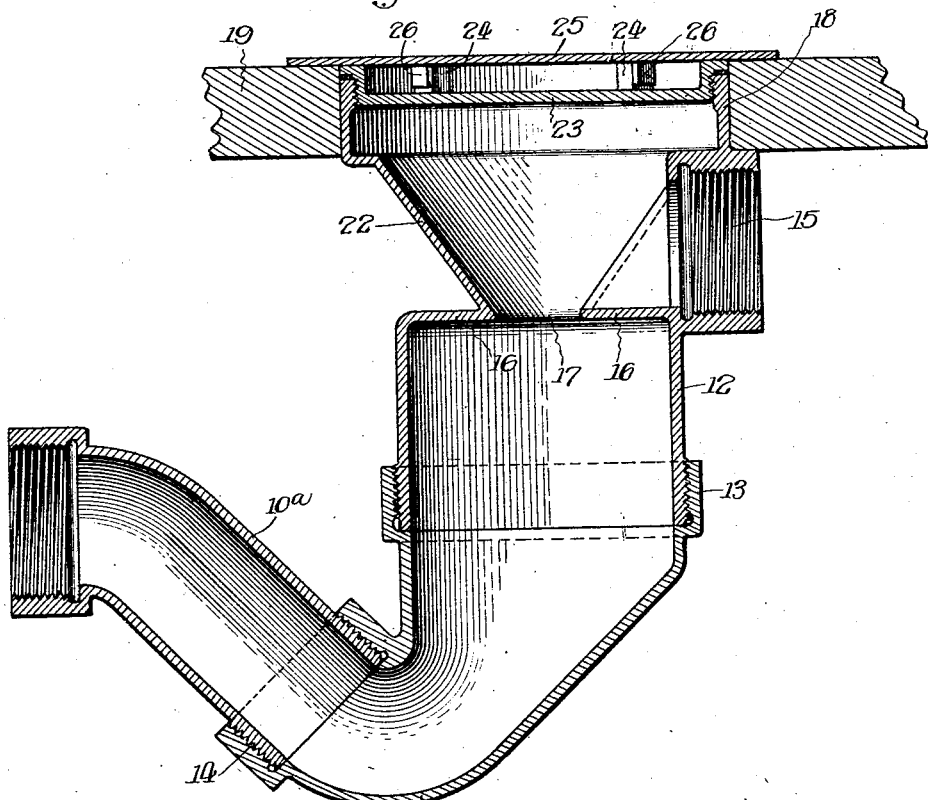
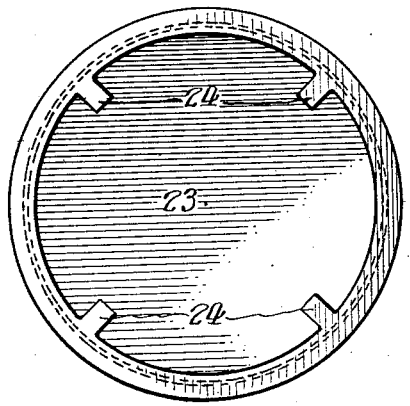
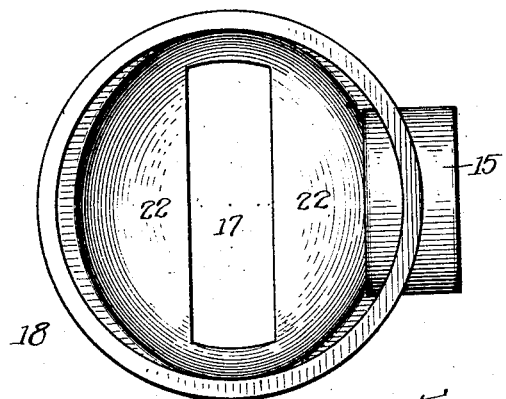
Inventor:
Henry J. Luff,
By Samuel N. Pond
Atty.
Witness:
A. J. Sauser.

Patented May 19, 1925.

1,537,955

UNITED STATES PATENT OFFICE.

HENRY J. LUFF, OF CLEVELAND, OHIO, ASSIGNOR, BY MESNE ASSIGNMENTS, TO MARY A. LUFF, OF CLEVELAND, OHIO.

RESEALING TRAP.

Application filed June 9, 1922. Serial No. 567,182.

*To all whom it may concern:*

Be it known that I, HENRY J. LUFF, a citizen of the United States, residing at Cleveland, in the county of Cuyahoga and State of Ohio, have invented certain new and useful improvements in resealing traps for use under any fixture from which the discharge enters directly or indirectly into a building sewer or building drain; and I do hereby declare that the following is a full, clear, and exact description of the invention, which will enable others skilled in the art to which it appertains to make and use the same.

Most municipal drainage regulations require certain minimum standards of sealing, scouring and resealing efficiency to be maintained in traps, under the maximum conditions of installation permissible; and it is with a view to fully meeting such requirements that the present resealing trap has been designed.

It is recognized by health officials that the water sealing trap placed under fixtures used to discharge liquid wastes into the building drainage system acts as a sentinel to guard against the inflow of noxious and germ-laden sewer air into homes and buildings, and therefore the requirement for the highest standard of efficiency is justified on the ground of public health. Experience has taught health officials that the practice of relying wholly upon "back-vent" or "re-vent" pipes to maintain the water seal in uniform diameter traps is fraught with considerable danger and expense, since they frequently fail to function at the times of greatest need; their inefficiency being manifested by the fact that in protracted freezing temperatures the vapor from hot water discharged into the drainage system passes up through these "back-vent" or "re-vent" pipes and at the point where the latter extend through the roof this vapor freezes and the pipe is gradually reduced in area and often completely frozen over. Moreover, in order to prevent birds from using these roof pipes as nests or perching thereon, wire baskets are frequently placed over them, and these wire baskets reduce the area, so that it is practically impossible to prevent the non-functioning of these roof vents from frost closure or during ice storms.

Many forms of so-called "anti-siphon" traps have been designed to prevent complete trap siphonage, in which baffle plates, secret partitions, deflectors, stand pipes, and impractical enlargement of the outlet leg and depth of seal, have been used; but these have retarded the natural outflow of the waste, thus preventing self-scouring efficiency; also gathered hair and lint in such a manner as to produce capillary attraction of the liquid and consequent siphonage of the trap seal; also the solids retained created a foul odor in the trap seal; and in many such traps a defect in the casting has permitted the entire seal of the trap to leak unnoticed into the waste pipe, or sewer air to leak over the seal of the trap into the room.

To provide a resealing trap adapted to be located beneath the floor of the room containing the fixture or fixtures which it serves which will obviate all of the above noted defects and objections has been the main purpose and object of the present invention, which latter, in one practical and approved embodiment thereof, is hereinafter fully described and disclosed in the accompanying drawings, in which—

Fig. 2 is a vertical sectional elevation through the discharge leg and outlet in a plane at right angles to the plane of Fig. 1, and showing the use of an inclined inflow leg in lieu of the vertical inflow leg of Fig. 1;

Fig. 3 is a top plan view of Fig. 2;

Fig. 4 is a top plan view of the removable plug which closes the top opening of the trap;

The resealing trap of the present invention, in common with a resealing trap forming the subject matter of a companion application filed concurrently herewith, Serial No. 567,181, is broadly characterized by the provision of a discharge leg which is of greater diameter than the inlet leg and the discharge opening of the trap, and substantially horizontal baffle plates disposed transversely of the discharge leg below the discharge opening and so spaced as to effectively cause a resealing of the trap when the fixture is discharged and at the same time provide an opening or flow passage between them of an area substantially equal to the area of the discharge opening. In my aforesaid companion application I have disclosed and broadly claimed this feature, and I have also shown therein a clean-out and inspection opening located in the inclined bottom and side wall of the discharge leg closed by a removable plug. In the trap of my present invention I provide a clean-out and inspection opening at the upper end of the trap directly above the laterally directed discharge opening; such clean-out and discharge opening permitting the insertion of the hand of the inspector downwardly beneath the baffle plates to ascertain the condition of the latter, and also, if not properly closed and sealed, itself giving evidence of such a condition through leakage when the fixture is discharged.

Figure 1:
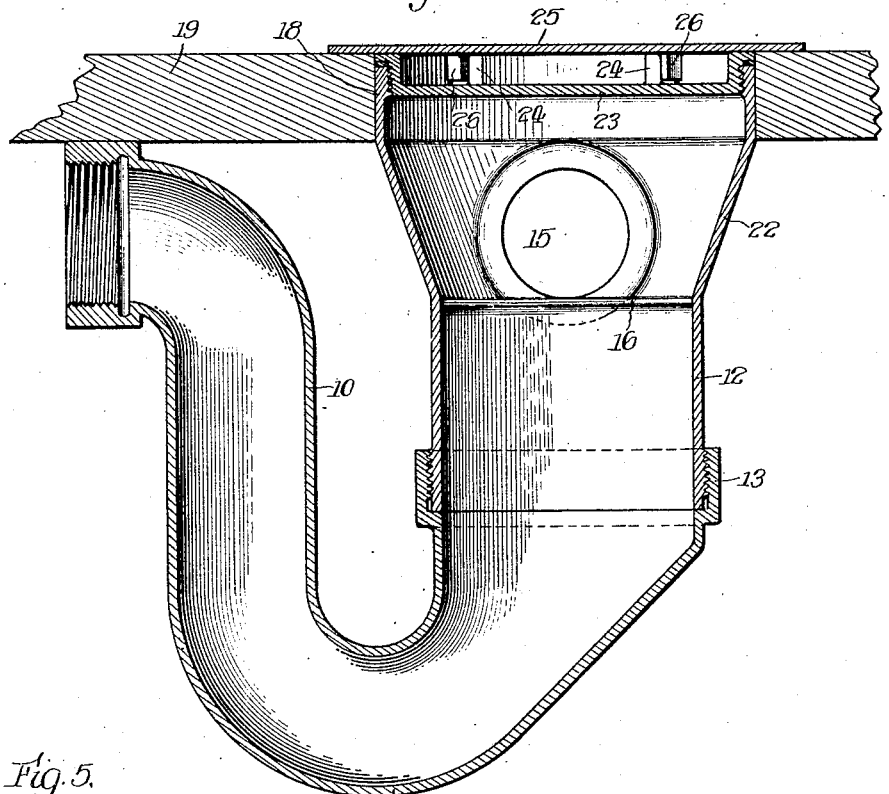
Fig. 1 is a vertical sectional elevation of an underfloor trap embodying my invention.
Figure 5:
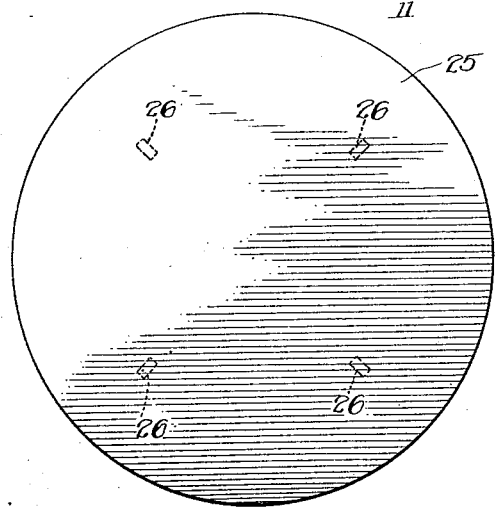
Fig. 5 is a top plan view of a removable floor cap.

In Fig. 1 the trap is shown as comprising two castings, one of which forms a substantially vertical inlet leg 10 and bottom bend 11, and the other of which comprises the discharge leg 12 of approximately twice the diameter of the inlet leg 10. The upper free end of the bottom bend 11 is tapered outwardly to the diameter of the discharge leg 12 and is provided with an integral tapped collar 13 forming a union with the threaded lower end of the discharge leg 12, the usual sealing and packing material of course being employed, or any other approved form of union connection being substituted.

In Fig. 2 I show an inflow leg 10ª coupled to a bottom bend 11ª by the threaded joint 14; said inflow leg 10ª being inclined substantially 45° from the vertical and adapted for use with comparatively long horizontal fixture connections to afford a seal of at least one inch depth.

Figure 6:
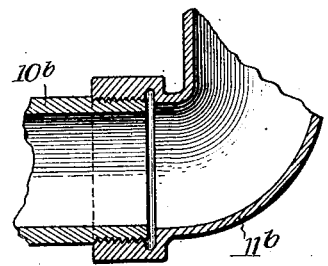
Fig. 6 shows a modified form of trap inlet.

In Fig. 6 I show a horizontal inlet leg 10ᵇ coupled to the bottom bend 11ᵇ; such a construction being adapted for a short horizontal connection to a bath tub with a low down outlet, this design enabling the necessary depth of seal to be obtained from the top of the floor.

Describing now the discharge or outlet portion of the trap wherein the novelty of the present invention mainly resides, this is the same in Figs. 1 and 2. 15 designates a horizontally directed tapped discharge opening at the upper end of the discharge leg 12. At the level of the bottom of said opening are formed a pair of horizontal segmental baffle plates 16, between the opposed edges of which is formed a substantially rectangular restricted opening or flow passsage 17, through which the discharge flows on its way to the discharge outlet 15. On the upper end of the discharge leg of the trap just above the discharge opening 15 is a collar 18 adapted to be fitted to a suitable opening in the floor 19 and internally threaded for a portion of its depth as shown at 20. On the lower side of said collar are formed a pair of opposed crescent-shaped internal flanges 21, the inner edges of which are joined to the straight inner edges of the segmental baffle plates 16 by tapered walls 22, each of said walls having a maximum inclination from the vertical at its center, as shown in Fig. 2, and gradually approaching the vertical toward its ends, as shown in Fig. 1.

23 designates a threaded plug adapted to screw tightly into the collar 18 and form a closure for the clean-out opening formed by the said collar. To facilitate application and removal of this plug by a suitable tool, said plug is provided with a plurality of spaced upstanding lugs 24 on its upper side located adjacent to its periphery. 25 designates a removable floor or escutcheon plate to cover and conceal the clean-out plug or closure 23. This plate 25 is formed on its under side with depending lugs 26 so positioned as to straddle the lugs 24 of the plug and serving to center the plate on the plug and lock the plate against rotation.

Briefly describing the functional features and advantages of the described construction, the baffle plates 16 and restricted flow passage 17 serve, while a discharge is taking place, to retain in the discharge leg of the trap and against the siphonic action, sufficient water to effect the resealing of the trap through backflow after the siphon is broken. The clean-out opening at the top of the trap and the flow passage 17 afford easy access through said floor passage for the fingers of the inspector to ascertain if the under sides of the baffle plates are smooth and free from accumulated matter, and to clean them when necessary. Furthermore, the downward tapering of the walls above the baffle plates and opposite the discharge opening creates a chamber of minimum capacity for the water flowing through the opening 17 to fill and overflow through the clean-out opening when a discharge takes place, in the event that said opening is not closed by its plug, or is leaky, thereby affording tell-tale evidence that the trap requires attention. Manifestly, the connection of the inflow leg and bottom bend of the trap to the discharge leg by the threaded joints shown or equivalent union connection permits the swinging of the inflow leg to any desired position around the vertical axis of the discharge leg, thus adapting the structure to varying conditions of installation. Again, by reducing the diameter of the inflow and bottom bend portions of the trap relatively to the diameter of the discharge portion, a minimum amount of water is required below the bottom of the trap seal, so that the water which is held in suspension when siphonic action takes place by the deflectors or baffles 16 will quickly flow back and fill the portion below the seal and secure the greatest depth of reseal.

I have herein shown the elongated opening or flow passage 17 disposed at a right angle to the axis of the discharge opening 15, but I do not confine its use to that particular design, since it may be used with equal efficiency when disposed parallel with the axis of the discharge opening or at any other angle thereto. While I show the discharge 15 extending at an angle of 90° to the discharge leg of the trap, it is obvious that the discharge may with equal efficiency extend at any angle from 90° to the vertical, or may be offset to bring it into vertical alignment with the inflow leg.

The term "resealing" as used herein is understood in the art by most persons skilled therein, but may be briefly explained as follows. When siphonic action takes place, either by the length of the vertical or downward grade of the fixture discharged, or the passage of waste from a higher fixture producing a vacuum, a part of the trap seal is siphoned out until air is admitted through the inlet, after which the water held in suspension while siphonic action is in progress, refills and reseals the trap to a safe depth. To effect the holding of sufficient water in suspension, the relative enlargement of the discharge leg of the trap and the baffles 16 are contributing factors of prime importance and efficiency.

I claim—

1. An under-floor resealing trap for the discharge lines of plumbing fixtures having a discharge leg of greater diameter than the inflow leg and comprising coaxial lower and upper vertical portions of lesser and greater cross-sectional areas at their upper ends respectively, said upper portion being open throughout the entire area of its upper end to form a hand-hole and having a lateral discharge opening, a pair of oppositely disposed horizontal segmental baffle plates located transversely of the upper end of said lower vertical portion of the discharge leg and forming between them a central substantially rectangular flow passage having approximately the area of said discharge opening, and a removable plug closing the open upper end of said discharge leg.

2. An under-floor resealing trap for the discharge lines of plumbing fixtures having a discharge leg comprising a vertical cylindrical portion, horizontal baffle plates extending across the top of said cylindrical portion and forming between them a restricted flow passage, an overflow chamber extending upwardly from the inner edges of said baffle plates, a discharge opening in the side wall of said overflow chamber, a collar continuous with the upper end of said overflow chamber adapted to fit an opening in the floor, and a removable closure for the upper end of said collar.

3. An under-floor resealing trap for the discharge lines of plumbing fixtures having a discharge leg comprising a vertical cylindrical portion, oppositely disposed horizontal segmental baffle plates extending across the top of said cylindrical portion and forming between them a restricted flow passage, an upwardly and outwardly flaring overflow chamber extending upwardly from the inner edges of said baffle plates, a discharge opening in the side wall of said overflow chamber, a threaded collar continuous with the upper end of said overflow chamber adapted to fit an opening in the floor, and a threaded plug forming a removable closure for the upper end of said collar.

HENRY J. LUFF.